United States Patent
Stockman et al.

(10) Patent No.: US 6,819,285 B1
(45) Date of Patent: Nov. 16, 2004

(54) MONOPULSE RADAR SYSTEM FOR DETERMINING THE HEIGHT OF A TARGET

(75) Inventors: Peter H. Stockman, Jamesville, NY (US); Miroslaw T. Hepel, Clay, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 10/770,920

(22) Filed: Feb. 3, 2004

(51) Int. Cl.$^7$ ............................................. G01S 13/44
(52) U.S. Cl. ................. 342/123; 342/133; 342/135; 342/139; 342/140; 342/146; 342/174; 342/194
(58) Field of Search ................. 342/123, 133, 342/134, 135, 139, 140, 146, 173, 174, 194, 195

(56) References Cited

U.S. PATENT DOCUMENTS

| | | | | |
|---|---|---|---|---|
| 2,468,045 A | * | 4/1949 | Deloraine | 340/990 |
| 2,480,208 A | * | 8/1949 | Alvarez | 342/142 |
| 4,404,561 A | | 9/1983 | Mulder et al. | 342/147 |
| 2003/0085833 A1 | * | 5/2003 | Yu | 342/17 |

* cited by examiner

*Primary Examiner*—John B. Sotomayor
(74) *Attorney, Agent, or Firm*—Plevy, Howard & Darcy, PC

(57) ABSTRACT

An improved method of estimating target elevation angle for dual squinted beam radar systems is disclosed. The target's elevation angle is estimated by receiving complex I/Q data from two receive radar beams and calculating the complex ratio of the complex I/Q data. The calculated complex ratio is compared to a set of previously determined reference complex ratios in complex lookup tables that have been corelated to known target elevation angles.

20 Claims, 4 Drawing Sheets

MONOPULSE RADAR SYSTEM FOR DETERMINING THE HEIGHT OF A TARGET

FIELD OF THE INVENTION

The present invention relates to radar systems, and more particularly to a monopulse radar system for determining the height of a cooperative or non cooperative detected target.

BACKGROUND OF THE INVENTION

A majority of the air traffic control (ATC) type radar systems that are currently in operation are relatively low cost two dimensional (2D) radars. Radars of this class include fixed-site civilian airport ATC radars as well as mobile military ATC radars. In these radars, a specially shaped reflector antenna, in conjunction with a pair of feeds, forms a pair of squinted fan beams that provide broad elevation detection coverage. The two feeds generate a pair of squinted beams called main and auxiliary. The elevation coverage is typically either 0 to 30 degrees or 0 to 40 degrees depending on the particular radar system. To optimize energy distribution, the fan beams have a cosecant-squared beam shape that provides long range coverage at low elevation angles and constant altitude coverage at all ranges. Traditionally, these systems are referred to as 2D because they only measure a target's range and azimuth.

To obtain elevational information on the targets, typical ATC radars are equipped with a secondary surveillance radar (SSR), from which a cooperating target's elevation information is obtained. The SSR sends out an interrogation signal and then receives a reply from the transponder located on the aircraft. The aircraft's transponder replies with a message that contains aircraft height above sea level information based on its own barometric sensor. Most civilian, commercial and military aircraft are equipped with transponders. But, for non-cooperating targets, that have defective transponders or deliberately operate with their transponders turned off, ATC radars cannot rely on the SSR to obtain the target's elevation information.

In order to obtain elevation information of a non-cooperating target using ATC type radars, receive beam data processing called monopulse radar angle estimation has been utilized. The main feed transmits the radar energy, and the target echo is received at each of the two feeds. On receive, the main feed, in conjunction with the reflector, generates the main receive fan beam. The auxiliary feed, positioned below the main feed, in conjunction with the reflector, generates a second receive fan beam that is squinted a few degrees higher in elevation from the main receive fan beam. Since it is higher in elevation, the auxiliary beam is useful for mitigation of near-in clutter. Each feed is connected to receive channel processing components, which includes a low noise amplifier, a down converter, a pulse compressor, and a Doppler filter bank. The output of the Doppler filter consists of complex data, or otherwise known as inphase (I) and quadrature (Q) data (hereinafter collectively referred to as the "I/Q" data). Monopulse processing is performed on the receive beam data and uses the I/Q data from the two receive channels to estimate target's elevation angle which is used to calculate the height of the target.

The monopulse radar angle estimation methods in use until now have relied on real-valued lookup tables. For example, in squinted-beam ATC radar systems, the prior art monopulse radar angle estimation methods used either the amplitude data of the receive beams or the phase data of the receive beams, but not both. The prior art amplitude-monopulse method extracts the magnitude of the I/Q data in each receive channel at the Doppler filter output, computes a ratio of the amplitudes, which is a real number, and then uses a real-valued lookup table to convert the ratio to the target's elevation angle. The real-valued lookup table contains a set of reference amplitude ratios that are correlated to a set of elevation angles. The prior art phase-monopulse method extracts the phase of the Doppler filter I/Q data in each channel, computes the phase difference between the channels, which is a real number, and then uses a real-valued lookup table to convert the phase difference to the target's elevation angle. The real-valued lookup table in this case contains a set of reference phase differences that are correlated to a set of elevation angles.

The aforementioned prior art squinted-beam methods for the ATC type radars are limited in their performance. The prior art amplitude-monopulse method provides valid estimates of target's elevation angle over a small range, only from 0 to about 4 degrees (within the radar's 0 to 30 degree detection coverage), which is much narrower than desired. The prior art phase-monopulse method provides a wider coverage, but is susceptible to a phase wrap-around problem induced by noise or interference. For example, a target at 28-degrees elevation might be estimated as being at 2-degrees elevation. Thus, an improved monopulse radar elevation angle estimation method for ATC type radars is desired.

SUMMARY OF THE INVENTION

According to an aspect of the present invention, there is disclosed a new monopulse radar angle estimation process, hereinafter referred to as the general complex (GC) monopulse method, and its application in radar systems for determining the elevation of a detected non-cooperating target. Application of the GC monopulse method allows the dual beam radar to determine the elevation angle of the target, and in turn the height of the target, more accurately. Although "monopulse" means one pulse, in the context of the present invention, the term is used in reference to receive processing of the radar echo signal and "monopulse" means one coherent burst of pulses.

Monopulse radar angle estimation requires data to be received simultaneously in two receive channels. Data in each channel, at the Doppler filter output, consists of a complex number representing the complex envelope of the signal, plus noise, that was pulse compressed and Doppler filtered. This complex number consists of a real component and an imaginary component, commonly known as the inphase/quadrature (I/Q) data. This complex data from one channel is divided by the complex data in the other channel to form a complex ratio. The GC monopulse method uses a complex lookup table to convert the complex ratio to the target elevation angle which is then used to calculate the target height. The complex ratio of the two beams (receive channels), is compared against a set of reference complex ratios in the complex lookup table to determine the corresponding elevation angle.

Although, the GC monopulse method works for arbitrary beam patterns, it is particularly advantageous in squinted beam radar systems. The GC monopulse method provides better accuracy, supports a wider range of operation, and has better wrap-around rejection compared to the prior art amplitude-only or the phase-only monopulse methods. Two examples of practical beam patterns are: a pair of squinted pencil-beams, or a pair of squinted cosecant-squared fan-beams. A pair of squinted pencil-beams can be formed either by a parabolic shape reflector with two vertically separated feeds, or by a phased-array radar with two beam formers and two electronically steered full-aperture sum-beams. Similarly, a pair of squinted cosecant-squared receive fan-beams can be formed by a specially shaped reflector with two vertically separated feeds, as is the case with the ATC type radar system described herein. The two receive beams in the ATC type radars, are referred to as elevation fan beams, substantially cosecant-squared in shape, and are squinted in elevation.

Thus, disclosed herein according to an embodiment of the present invention is a radar system for determining the height of a target. The system comprises a transmitter for generating a pulse of radio energy; an antenna for emitting the pulse from the transmitter and receiving a target echo signal. The system further comprises two receive channels electrically connected to the antenna for receiving two receive beams: a main receive beam from the main feed and an auxiliary receive beam from the auxiliary feed. The system receives I/Q data from each of the two receive beams, and calculates a compensated complex-ratio of the two I/Q data (hereinafter referred to as the "compensated received complex-ratio"). Finally, a conversion unit converts the compensated received complex-ratio to the target's height.

DETAILED DESCRIPTION OF THE INVENTION

Figure 1:
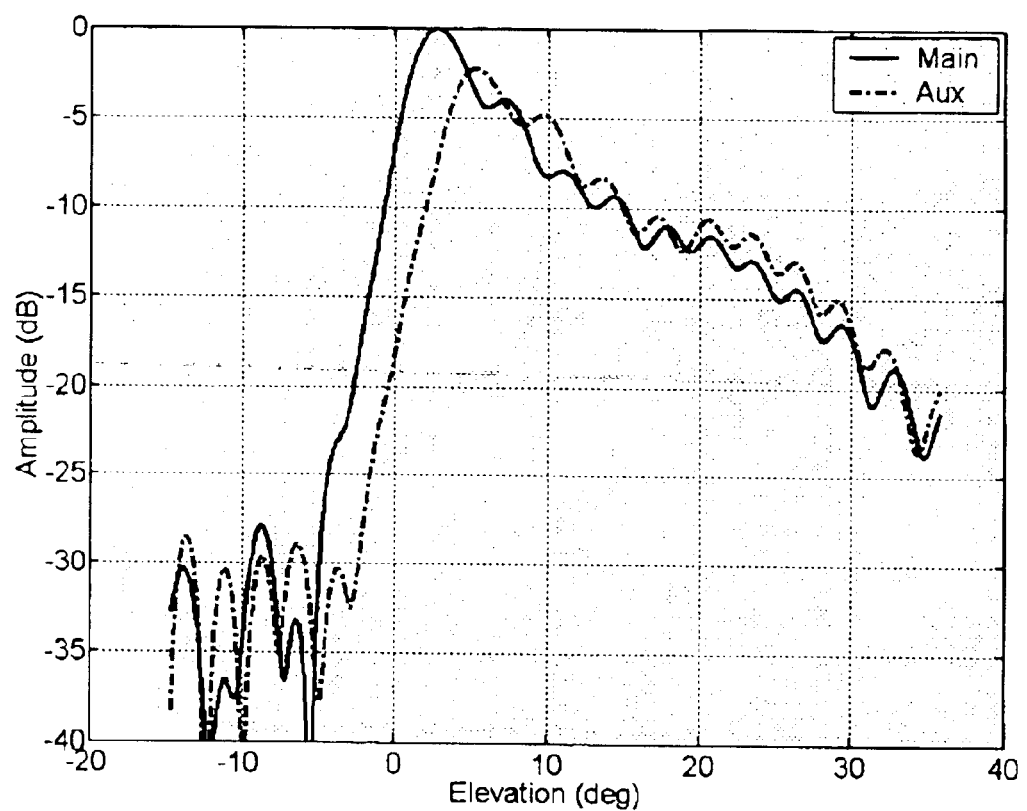
FIG. 1 is a plot of the amplitude of the complex number (I/Q) for the main and the auxiliary channels plotted as a function of the elevation.
Figure 2:
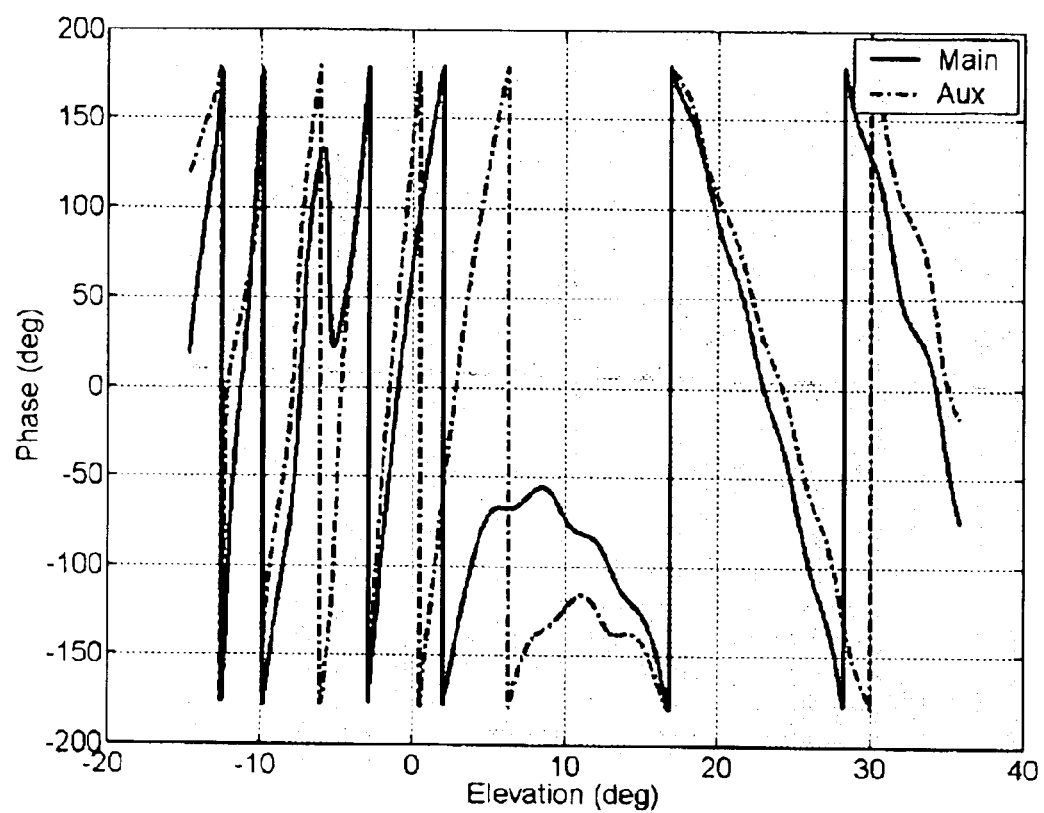
FIG. 2 is a plot of the phase of the complex number (I/Q) for the main and the auxiliary channels plotted as a function of the elevation.
Figure 3:
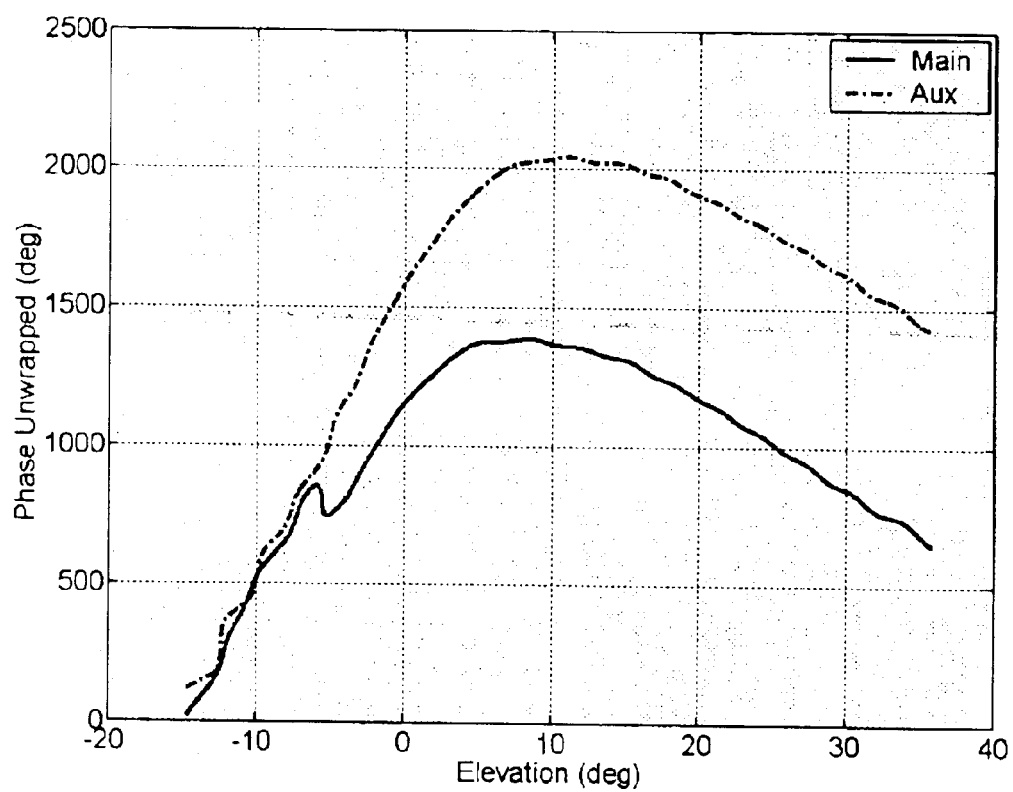
FIG. 3 is a plot of the phase of the complex number (I/Q) unwrapped.

Although in this discussion we only refer to a 30 degree range of detection coverage (ie., 0–30 degrees elevation angle), these concepts are applicable to all ATC type systems, some of which may support detection up to about 40 degrees elevation. The amplitude of the complex data (I/Q) for the main and the auxiliary channels as a function of elevation is shown in FIG. 1. The phase of the complex data (I/Q) for the main and the auxiliary channels as a function of elevation is shown in FIG. 2. The phase in each channel wraps around several times within 0 to 30 degrees. Unwrapping the phase helps to visualize that there exists a well-behaved phase relationship between the two channels. This is illustrated in FIG. 3. The difference between the curves, auxiliary channel phase minus main channel phase, represents the phase advance, $\Delta\phi$, between the signals in the main channel and the auxiliary channel. $\Delta\phi$ is a monotonically increasing monopulse function from 0–30 degrees elevation.

The phase advance between the beams is calculated by, $\Delta\phi = 2\pi f \Delta T$, where $\Delta T = \Delta D/c$,
f is radio frequency (RF) or radar operating frequency,
c is the speed of light, and
$\Delta D$ is the differential distance from the target to the feeds.

At 2.8 GHz, the center of the ATC RF band, the phase advances $2\pi$ or 360 degrees which yields $\Delta D$ of about 4.2 inches or about one wavelength. This phase advance takes place over target elevation angles, $\theta$, within the radar's detection coverage of about 0 to 30 degrees, where 0 degrees elevation refers to the local horizontal. $\Delta\phi$ is the phase of the auxiliary receive beam relative to phase of main receive beam. $\Delta\phi$ increases with elevation angle, which means that the energy travels a relatively longer distance from the target to the auxiliary feed than to the main feed as the elevation angle increases. The auxiliary feed is located below the main feed forming an auxiliary beam steered to a higher elevation angle. In other words, at 30 degrees of elevation, the distance is longer to the auxiliary feed than to the main feed by one wavelength with respect to the distance at 0 degrees of elevation. The main feed and the auxiliary feed are offset in the vertical plane such that this one wavelength delta is achieved at 30 degrees. $\Delta D$ is the distance between the target and the phase centers of the two feeds. Bringing the feeds closer together limits the amount of phase advance $\Delta\phi$ to less than 360 degrees, resulting in relatively reduced sensitivity. Separating the feeds further apart allows the phase advance to traverse more than 360 degrees introducing potentially unresolvable ambiguities. If the radar is expected to be operated at frequencies other than 2.8 GHz, or at multiple frequencies, then it may be desirable to design the antenna to satisfy the one-wavelength constraint at the highest frequency. For example, for a multiple frequency operation within the 2.7 to 2.9 GHz ATC band, it may be desirable to design for $\alpha\phi$ of 360 degrees at 2.9 GHz in order to avoid ambiguities. That way $\Delta\phi$ is one wavelength at 2.9 GHz and slightly less than a wavelength at lower frequencies within the band.

It is this one wavelength difference versus elevation angle that produces the phase information in the I/Q data. Given that the receive data comprises the echo signal plus noise, the noise can cause the phase of the I/Q data to wrap around, when traversing past 360 degrees, and the phase reverts back to 0 and continues upwards from there. If phase information were used on its own, the estimated target angle would wrap around whenever the phase wraps around. However, the GC monopulse method takes advantage of additional information from the amplitude response data in the I/Q data, hence substantially reducing the occurrence of target wrap-around.

Figure 4:
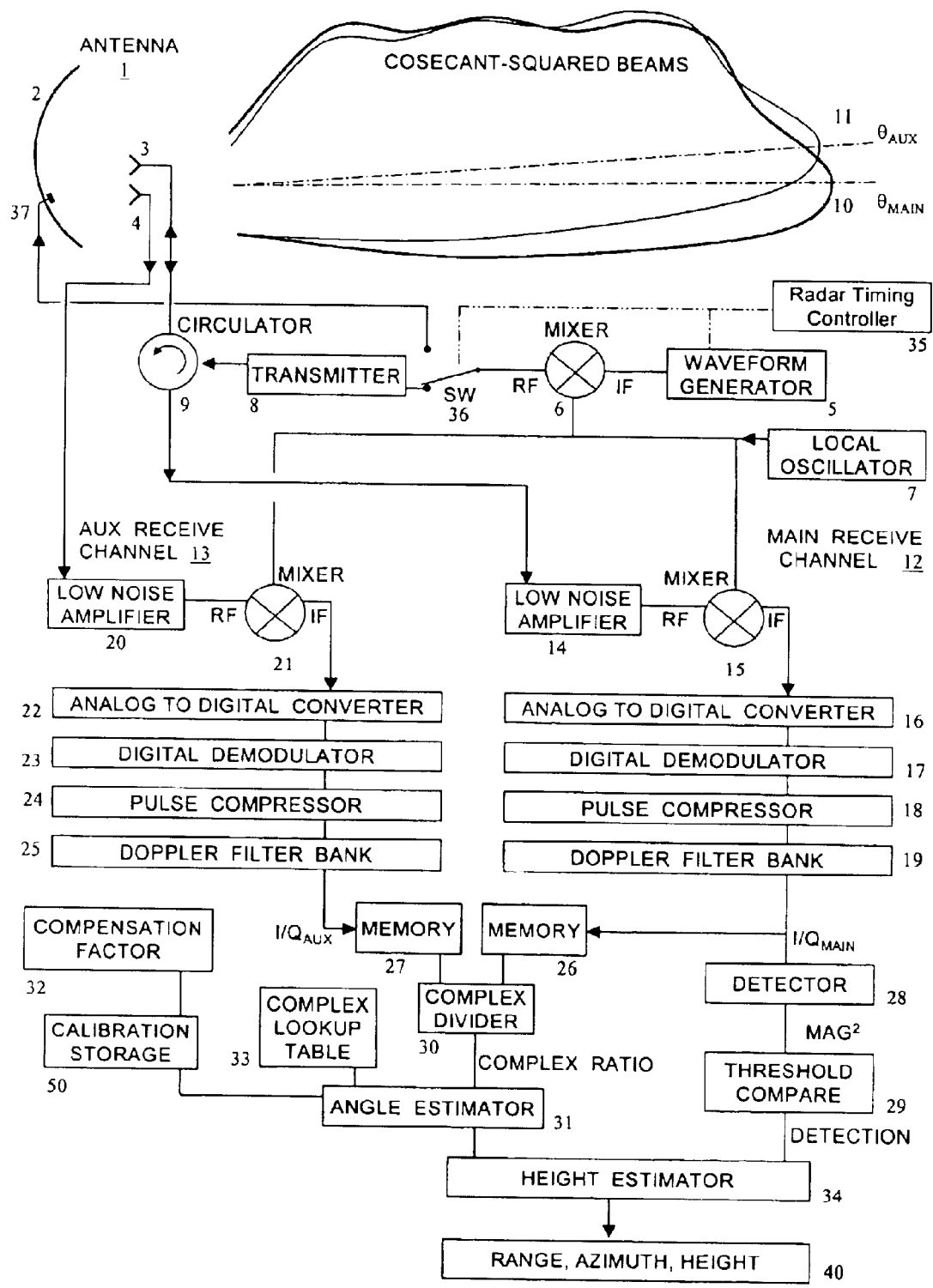
FIG. 4 is a schematic illustration of a radar system in accordance with an embodiment of the present invention.

FIG. 4 depicts an ATC type radar system according to an embodiment of the present invention. An antenna 1 comprises a reflector 2 with two feeds, 3 and 4. A waveform generator 5 creates the radar transmission pulse at intermediate frequency (IF), which is then upconverted to radio frequency (RF) by the mixer 6 and local oscillator 7. A transmitter unit 8 provides power amplification. The amplified high power pulse is sent from the transmitter 8 through a duplexer (or circulator) 9 to the main feed 3. Transmission of the radar beam takes place only out of the main feed 3. But, both feeds are used for receiving the echo signal. The radar system may be provided with a radar timing controller (RTC) 35, a central processing unit, for controlling the radar system's operation.

The GC monopulse processing is performed on the receive beams. On receive, the reflector 2 in conjunction with the main feed 3 forms the main receive beam 10. The reflector 2 in conjunction with the auxiliary feed 4 forms an auxiliary receive beam 11. The auxiliary feed 4 is mounted below the main feed 3 by about 8 inches, so it is offset from the focal point of the reflector 2. Because of the focusing effect of the reflector 2, the auxiliary receive beam 11 has a higher elevation than the main receive beam 10. The two receive beams are elevation fan beams, substantially cosecant-squared in shape, and are squinted in elevation. The reflector 2 is shaped and tilted back in order to balance good detection coverage at short range and long range. The main feed 3 is placed at the focal point of the reflector 2. The auxiliary feed 4 is placed below the main feed 3, rather than above, because it is preferred to elevate the auxiliary receive beam in order to have less surface clutter in the auxiliary beam. As a result, in this embodiment of the present invention, the maximum sensitivity of the main receive beam 10 is at elevation angle, $\theta_{main}$, equal to about 2.8 deg, whereas the auxiliary receive beam 11 has a couple of degrees higher elevation angle, $\theta_{aux}$ equal to about 5.5 deg, where 0 degrees is the local horizontal.

The two receive beams 10 and 11 are shown as a function of target elevation angle. The auxiliary receive beam has a slightly different beam shape and lower gain because it is not exactly in the focal point of the reflector.

The two feeds are electrically connected to two independent receive signal processing channels, hereinafter called receive channels, a main receive channel 12 and an auxiliary receive channel 13. The main receive channel 12 comprises a low noise amplifier 14, a mixer 15, an analog to digital converter 16, a digital demodulator 17, a pulse compressor 18, and a main Doppler filter bank 19. The auxiliary channel 13 comprises a low noise amplifier 20, a mixer 21, an analog to digital converter 22, a digital demodulator 23, a pulse compressor 24, and an auxiliary Doppler filter bank 25. These receive channel components process the receive beams' signal in each receive channel and obtain their complex data, $I/Q_{main}$ and $I/Q_{aux}$ data.

The output of the main Doppler filter bank 19 is $I/Q_{main}$ data of the main receive beam 10, which is complex data representing the complex envelope of the main receive beam signal, plus noise, that has been pulse compressed and Doppler filtered. The output of the auxiliary Doppler filter bank 25 is $I/Q_{aux}$ data of the auxiliary receive beam 11, which is complex data representing the complex envelope of the auxiliary receive beam signal, plus noise, that has been pulse compressed and Doppler filtered. As discussed before, the real and imaginary components of the complex data are referred to as the inphase and quadrature components, respectively. The $I/Q_{main}$ and $I/Q_{aux}$ data from each channel are stored in memory units 26 and 27 for later use when a target detection is declared.

Next, the $I/Q_{main}$ data from the Doppler filter bank 19 is sent to square-law detector 28 for target detection processing. The square-law detector 28 outputs magnitude-squared of the $I/Q_{main}$ data (i.e., equal to $I^2_{main}+Q^2_{main}$). Threshold compare module 29, then, declares a detection if the output from the square-law detector 28 exceeds a detection threshold. The threshold compare 29 function may be implemented in digital signal processor software, for example. When a detection is declared, a detection signal is generated, at which point memory units 26 and 27 are accessed to retrieve the corresponding $I/Q_{main}$ and $I/Q_{aux}$ data.

As discussed above, the target detection is usually accomplished using the $I/Q_{main}$ data of the main receive beam 10. However, when a target is at close-range, ground clutter becomes a factor and the radar system may be configured to conduct the target detection processing using the $I/Q_{aux}$ data of the auxiliary receive beam 11. Because the auxiliary receive beam 11 is elevated (relative to the main beam), the auxiliary receive beam 11 contains less interference from the ground than the main receive beam 10, and is less susceptible to the ground clutter effect.

When a target is detected, the target's range, azimuth and elevation are estimated. Estimation of the target's range and azimuth from the receive beam is the same as in any conventional ATC type radars. The target elevation is determined using the GC monopulse processing according to an embodiment of the present invention. The two receive beams' received complex data, $I/Q_{main}$ and $I/Q_{aux}$, stored in the memory units 26 and 27, respectively, are fed into a complex divider 30, where a received complex-ratio is calculated by computing:

$$\text{recieved complex-ratio} = \frac{I/Q_{aux}}{I/Q_{main}}.$$

A conversion unit, then, converts the received complex-ratio to the target's height. The conversion unit comprises an angle estimator 31 a complex lookup table 33, and a height calculator 34. The angle estimator 31 utilizes complex lookup table 33 to convert the received complex-ratio to the target's elevation angle $\theta_{target}$. But in most cases, because of channel-to-channel drift of amplitude and/or phase between the receive channels, the angle estimator 31 first compensates for any channel-to-channel drift in the receive channels by dividing the received complex-ratio by a compensation factor 32. As will be discussed in more detail below, the receive beam signal's amplitude and/or phase may drift with time and variations over radar frequency and cause deviations in measured I/Q data between each of the receive channels. The compensation factor 32 eliminates this drift effect and improves the accuracy of the conversion unit. The output of this compensation operation is referred to, herein, as the compensated received complex-ratio. Then, the angle estimator 31 utilizes complex lookup table 33 to convert the compensated received complex-ratio to the target's elevation angle $\theta_{target}$. The compensation factor 32 is provided by the radar system's calibration circuit which will be described in more detail later.

The complex lookup table 33 is a correlation table that contains a plurality of reference complex-ratios and target elevation angle corresponding to each reference complex-ratio. The complex lookup table 33 contains a reference complex-ratio for predetermined increments of angle from 0 to 30 degrees elevation at some reasonable number of increments depending on the desired resolution. For example, the complex lookup table 33 may preferably contain reference complex--ratios corresponding to angles taken in 0.05 degree increments in the 0 to 30 degree range, especially in the 0 to 6 degree region. The target's elevation angle $\theta_{target}$ is found by searching the complex lookup table 33 for an entry that has the smallest Euclidean distance to the compensated received complex-ratio. The angle estimator 31 may contain such algorithm (e.g. a program) that executes the data processing necessary to locate the entry with the smallest Euclidean distance.

The complex lookup table 33 may be generated in a number of ways. A preferred method is to actually measure the channel-to-channel relationship (i.e., the compensated received complex-ratios) for targets at various known elevation angles. When generating the complex lookup table 33, the known target elevation angle is referred to as the truth data. The truth data may be collected in a controlled test facility using one or more targets whose elevation and range can be controlled. Using a controlled test facility, one can obtain the reference complex-ratios for every elevation angle increments desired for the complex lookup table 33.

But, a more convenient and less costly method of collecting the data for the complex lookup table 33 is to simply collect data on targets of opportunity. A typical ATC radar is equipped with a secondary surveillance radar (SSR) to provide reliable target height on cooperating targets. The SSR sends out an interrogation signal and then receives a reply from each of the transponders located on cooperating aircrafts within the SSR's range. An aircraft's transponder replies with a message that contains the aircraft's height above sea level based on it own barometric sensor. Having measured target range, the aircraft's height is easily converted to elevation angle and serves as the truth data.

The complex lookup table 33 is populated by recording the compensated receive complex-ratio for the elevation angle provided by the SSR. Using this method, a lookup table containing compensated receive complex-ratios for a substantial number of elevation angle increments in the 0 to 30 degree detection coverage may be created using targets of opportunity at normal air-traffic congestion levels. These compensated receive complex-ratios serve as the reference complex-ratios in the complex lookup table. Using this method, because of the reliance on targets of opportunity for the truth data, it may not be necessarily feasible to get compensated receive complex-ratio values for each and every elevation angle increment. But given sufficient time and sufficient number of targets of opportunity, a substantial number of the elevation angle increments may be covered to make the table useable. This set of reference complex-ratios is valid for the given RF radar operating frequency. In one configuration, a separate lookup table may be created for every RE radar operating frequency in use. Once all the lookup tables are generated, they do not need to be updated because the calibration circuit of the radar system is used to compensate for any channel-to-channel drift in the amplitude and/or phrase of the received I/Q data caused by changes in the receiver response over time and variation over frequency of the monopulse radar beam.

As discussed above, the calibration circuit generates the compensation factor 32 used in the GC monopulse processing. The calibration circuit comprises the waveform generator 5 for generating a test pulse; a low power transmission test element 37 for transmitting a test pulse; the receive channel components including the main feed 3, the auxiliary feed 4, low noise amplifiers 14 and 20, mixers 15 and 21, analog to digital converters 16 and 22, digital demodulators 17 and 23, and pulse compressors 18 and 24, and a calibration data storage unit 50. To generate a compensation factor 32, the RTC 35 initiates a calibration sequence using the above-listed components of the calibration circuit.

The RTC 35 may initiate the calibration sequence periodically during the normal operation of the radar system so that the two receive channels are calibrated on an on-going basis. An exemplary schedule of the radar operation where a calibration sequence is executed may be as follows: a short range (SR) pulse transmission for short range target detection; SR receive period; a long range (LR) pulse transmission for long range target detection; LR receive period; and finally a test pulse transmission with a simultaneous test pulse receive period. SR and LR pulses are amplified by the transmitter 8 and emitted by the main feed 3. Then, a configurable control signal, the receive gate, determines when the receive beam processing is enabled in relation to the start of the transmit pulse. During normal operation, i.e. target detection mode, receive beam processing is disabled during the transmission of SR or LR pulse for target detection. After the transmitter 8 has finished transmitting the SR or LR pulse, the RTC generates a receive gate control-signal that triggers the analog to digital converters 16 and 22 to begin the receive processing. On the other hand, during a calibration sequence, the transmission of the test pulse by the test element 37 and receive processing of the test pulse by the main and the auxiliary receive channels 12 and 13 happen simultaneously. In other words, the main and the auxiliary receiver channels 12 and 13 are enabled during the transmission of the test pulse. During the test-loop sequence, the RTC 35 commands the waveform generator 5 to generate a single test pulse, which is rerouted by switch 36 directly to the low power transmission test element 37 mounted on the reflector 2. The test pulse is transmitted by the test element 37, at relatively low power, and picked up by the main and the auxiliary feeds 3 and 4 generating a received test pulse signal in each of the channels.

The received test pulse signals follow the normal receive processing steps except for Doppler filtering. For example, the received test pulse signals are amplified by the LNAs 14 and 20, digitized by the analog to digital converters 16 and 22, demodulated by the digital demodulators 17 and 23, and compressed by the pulse compressors 18 and 24. Doppler filter processing is not performed on the received test pulse signals since the test pulse consists of only a single pulse instead of a set of coherent pulses.

The output of the pulse compressors 18 and 24 are the $I/Q_{aux-test}$ and $I/Q_{main-test}$ data for the test pulse for the main and the auxiliary channels. The compensation factor 32 for compensating for any channel-to-channel drift between the main and the auxiliary channel is obtained by computing:

$$\text{compensation factor} = \frac{I/Q_{aux-test}}{I/Q_{main-test}}$$

the calibration circuit of this embodiment of the present invention measures the channel-to-channel variation by using the test-element 37 embedded within the reflector 2 and shooting one test signal to the main feed 3 and the auxiliary feed 4.

The compensation factor 32 varies as a function of frequency of the radar beam. And, thus, calibration sequence are scheduled periodically and sequenced through all RF radar operating frequencies in use by the normal detection processing. A table of the compensation values vs. frequency data may be stored in the calibration data storage 50 to be accessed by the angle estimator 31 to compensate for the channel-to-channel drift when calculating the elevation angle.

Thus, an ATC type radar enabled with the GC monopulse method can be used to estimate the elevation of non-cooperative targets, which have their SSR transponder disabled. A complex-ratio of the target is first obtained according to the steps described above. A compensated receive complex-ratio is then calculated by the complex divider 30 by dividing the complex-ratio by the compensation factor 32. Next, the angle estimator 31 compares the compensated receive complex-ratio to the set of reference complex-ratios in the complex lookup table 33 to find the closest match target elevation angle. The closest match target elevation angle is the one that corresponds to the reference complex-ratio entry in the complex lookup table 33 that is the smallest Euclidean distance from the compensated receive complex-ratio.

The data processing involved in finding the smallest Euclidean distance may be performed by the angle estimator 31. The data processing steps involved may be implemented in three steps. For example, first, the compensated receive complex-ratio is subtracted from each entry of reference complex-ratios in the complex lookup table 33. Next, the absolute value of each of the subtraction result is taken to find the reference complex-ratio entry that has the smallest absolute value. That entry in the complex lookup table 33 is the one that has the smallest Euclidean distance from the compensated receive complex-ratio. The target elevation angle $\theta_{target}$ corresponding to the complex-ratio entry having the smallest Euclidean distance from the compensated receive complex-ratio is, then, the closest estimate of the actual target's elevation angle.

Once the target's elevation angle $\theta_{target}$ is known, it is a matter of simple trigonometry to calculate the height of the target since the range of the target is known from the target detection processing. The target height is calculated by the height calculator 34 component of the conversion unit using the target elevation angle $\theta_{target}$ and the target-range information obtained from the threshold compare 29. The target elevation angle $\theta_{target}$ may range from 0 to 30 degrees, where 0 degree is the local horizontal. For best accuracy, the height calculator 34 may account for the curvature of the Earth and also account for the radar's own elevation above sea level to calculate the target's height above sea level.

Once the height of the target is calculated, an output 40 containing the target's range, azimuth, and the height information is generated, classifying this as a 3D radar. The output 40 may be displayed on a local display device and/or transmitted to various other destinations.

Although the examples discussed above are in the context of ATC type radar systems that utilize a pair of squinted cosecant-squared fan-beams, the GC monopulse method of the present invention is equally applicable to other types of radar systems. For example, the GC monopulse method may be applied in a radar system utilizing a pair of squinted pencil-beams. A pair of squinted pencil-formed beams can be formed either by a parabolic shape reflector with two vertically separated feeds, or by a phased-array radar with two beam formers and two electronically steered full-aperture sum-beams.

While the foregoing invention has been described with reference to the above embodiments, various modifications and changes can be made without departing from the spirit of the invention. Accordingly, all such modifications and changes are considered to be within the scope of the appended claims.

What is claimed is:

1. A method of determining a detected target's elevation in a radar system, the method comprising:
   generating a main receive beam from a main receive channel and an auxiliary receive beam from an auxiliary receive channel;
   receiving complex data, I/Q$_{main}$ and I/Q$_{aux}$, from the main receive beam and the auxiliary receive beam, respectively;
   detecting the target based on the received data;
   calculating a received complex-ratio by computing:

$$\text{recieved complex-ratio} = \frac{I/Q_{aux}}{I/Q_{main}};$$

calculating a compensated received complex-ratio by compensating the received complex-ratio for any channel-to-channel drift in the receive channels; and
   converting the compensated received complex-ratio to the target elevation angle.

2. The method of claim 1, wherein the step of calculating a compensated received complex-ratio comprises dividing the received compex-ratio by a compensation factor.

3. The method of claim 1, wherein the step of converting the compensated receive complex-ratio to the target elevation comprises:
   comparing the compensated received complex-ratio to a set of reference complex-ratios in a complex lookup table and finding the closest match target elevation angle.

4. The method of claim 3, wherein the step of finding the closest match target elevation angle comprises:
   locating a reference complex-ratio entry in the complex lookup table that has the smallest Euclidean distance from the compensated received complex-ratio.

5. The method of claim 1, further comprising:
   generating at least one complex lookup table which contains a plurality of reference complex-ratios and target elevation angle corresponding to each of the reference complex-ratios.

6. The method of claim 1, further comprising:
   executing a calibration sequence, the calibration sequence comprising:
   transmitting a low power test pulse from a low power transmission test element;
   receiving the test pulse at a main and an auxiliary feeds;
   receive processing the test pulse to obtain the test pulse's complex data, I/Q$_{aux-test}$ and I/Q$_{main-test}$, in each of the two receive channels, and calculating a compensation factor by computing:

$$\text{compensation factor} = \frac{I/Q_{aux-test}}{I/Q_{main-test}}.$$

7. A radar system for determining the height of a detected target comprising:
   a transmitter for generating a pulse of radio energy;
   an antenna for emitting the pulse from the transmitter and receiving a target echo signal;
   two receive channels, electrically connected to the antenna, for receiving a main monopulse receive beam and an auxiliary monopulse receive beam, measuring I/Q data from each of the two monopulse receive beams;
   a complex divider for calculating a compensated received complex-ratio of the two I/Q data; and
   a conversion unit for converting the compensated received complex-ratio to the target's height.

8. The radar system of claim 7, wherein the antenna comprises a reflector, a main feed and an auxiliary feed, the main feed transmitting the pulse from the transmitter, the antenna, in conjunction with the two feeds, forming the two monopulse receive beams, the main monopulse receive beam at the main feed and the auxiliary monopulse receive beam at the auxiliary feed.

9. The radar system of claim 8, wherein the two receive beams are elevation fan beams, substantially cosecant-squared, and are squinted in elevation.

10. The radar system of claim 8, wherein the reflector is a parabolic reflector and the two receive beams are squinted pencil beams formed by a parabolic reflector with two vertically separated feeds.

11. The radar system of claim 7, wherein the antenna comprises a phased-array radar with two beam formers and two electronically steered full-aperture sum beams.

12. The radar system of claim 7, wherein the conversion unit comprises:
   a complex lookup table containing a plurality of reference complex-ratios and target elevation angles corresponding to each reference complex-ratios; and
   an angle estimator that locates the reference complex-ratio entry that has the smallest Euclidean distance from the compensated received complex-ratio to find the corresponding target elevation angle.

13. A radar system for determining the height of a detected target comprising:

a transmitter for generating a pulse of radio energy;

an antenna for emitting the pulse from the transmitter and receiving a target echo signal;

two receive channels, electrically connected to the antenna, for receiving a main monopulse receive beam and an auxiliary monopulse receive beam, receiving I/Q data, $I/Q_{main}$ and $I/Q_{aux}$, from each of the two monopulse receive beams, respectively;

a complex divider for calculating a compensated received complex-ratio of the two I/Q data;

a conversion unit for converting the compensated received complex-ratio to the target's height; and a calibration circuit for executing a calibration sequence for generating a compensation factor for compensating channel-to-channel amplitude and/or phase drift with time and variation over frequency.

14. The radar system of claim 13, wherein the antenna comprises a reflector, a main feed and an auxiliary feed, the main feed transmitting the pulse from the transmitter, the antenna, in conjunction with the two feeds, forming the two monopulse receive beams, the main monopulse receive beam at the main feed and the auxiliary monopulse receive beam at the auxiliary feed.

15. The radar system of claim 14, wherein the two receive beams are elevation fan beams, substantially cosecant-squared, and are squinted in elevation.

16. The radar system of claim 14, wherein the reflector is a parabolic reflector and the two receive beams are squinted pencil beams formed by a parabolic reflector with two vertically separated feeds.

17. The radar system of claim 13, wherein the antenna comprising a phased-array radar with two beam formers and two electronically steered full-aperture sum beams.

18. The radar system of claim 13, wherein the conversion unit comprises:

at least one complex lookup table containing a plurality of reference complex-ratios and target elevation angles corresponding to each reference complex-ratio; and an angle estimator that locates the reference complex-ratio entry in the at least one complex lookup table that has the smallest Euclidean distance from the compensated received complex-ratio to find a corresponding target elevation angle, wherein the at least one complex lookup table corresponds to the radar's RF radar operating frequency.

19. The radar system of claim 13, wherein the calibration circuit comprises:

a waveform generator for generating a test pulse;

a low power transmission test element provided in the reflector for transmitting a test pulse that is received by the main and the auxiliary feeds; and receive channel components including the main feed, the auxiliary feed, low noise amplifiers, mixers, analog to digital converters, digital demodulators, and pulse compressors, wherein the calibration sequence comprises a low power transmission of a test pulse from the low power transmission test element, receiving the test pulse at the main and the auxiliary feeds, receive processing the test pulse to obtain the test pulse's complex data, $I/Q_{aux\text{-}test}$ and $I/Q_{aux\text{-}main}$, in each of the two receive channels, and calculating the compensation factor by computing:

$$\text{compensation factor} = \frac{I/Q_{aux-test}}{I/Q_{aux-main}}.$$

20. The radar system of claim 13, wherein the calibration circuit further comprising a calibration data storage unit for storing the compensation factor.

* * * * *

UNITED STATES PATENT AND TRADEMARK OFFICE
CERTIFICATE OF CORRECTION

PATENT NO. : 6,819,285 B1
DATED : November 16, 2004
INVENTOR(S) : Peter H. Stockmann and Miroslaw T. Hepel It is certified that error appears in the above-identified patent and that said Letters Patent is hereby corrected as shown below:

<u>Title page,</u>
Item [75], Inventors, "Peter H. Stockman" should read -- Peter H. Stockmann --

Signed and Sealed this

Twenty-sixth Day of April, 2005

JON W. DUDAS
*Director of the United States Patent and Trademark Office*